United States Patent [19]
McDonough et al.

[11] Patent Number: 6,070,142
[45] Date of Patent: May 30, 2000

[54] VIRTUAL CUSTOMER SALES AND SERVICE CENTER AND METHOD

[75] Inventors: Charles McDonough; Bryan Bunting, both of Charlotte, N.C.

[73] Assignee: Andersen Consulting LLP, Chicago, Ill.

[21] Appl. No.: 09/062,151

[22] Filed: Apr. 17, 1998

[51] Int. Cl.⁷ .............................. H04M 7/00; G06F 15/21
[52] U.S. Cl. .................... 705/7; 705/8; 705/9; 705/10; 705/11; 705/26; 379/34; 379/220; 379/225
[58] Field of Search ................. 705/8, 9, 10, 11, 705/7; 379/34, 220, 225

[56] References Cited

U.S. PATENT DOCUMENTS

| | | | |
|---|---|---|---|
| 4,289,934 | 9/1981 | Pitroda et al. | 379/269 |
| 4,466,098 | 8/1984 | Southard | 714/12 |
| 4,674,036 | 6/1987 | Conforti | 709/400 |
| 4,700,381 | 10/1987 | Eher | 379/279 |
| 4,737,983 | 4/1988 | Frauenthal et al. | 379/221 |
| 4,755,995 | 7/1988 | Anderson et al. | 714/31 |
| 4,866,763 | 9/1989 | Cooper et al. | 379/221 |
| 4,881,261 | 11/1989 | Oliphant et al. | 379/215 |
| 4,951,310 | 8/1990 | Honda et al. | 379/266 |
| 4,988,209 | 1/1991 | Davidson et al. | 370/270 |
| 5,023,868 | 6/1991 | Davidson et al. | 370/221 |
| 5,031,211 | 7/1991 | Nagai et al. | 379/221 |
| 5,036,535 | 7/1991 | Gechter et al. | 379/210 |
| 5,062,103 | 10/1991 | Davidson et al. | 370/270 |
| 5,073,890 | 12/1991 | Danielsen | 370/270 |
| 5,113,430 | 5/1992 | Richardson, Jr. et al. | 379/88 |
| 5,153,909 | 10/1992 | Beckle et al. | 379/265 |
| 5,175,866 | 12/1992 | Childress et al. | 455/8 |
| 5,185,780 | 2/1993 | Leggett | 379/34 |
| 5,193,110 | 3/1993 | Jones et al. | 379/93.14 |
| 5,214,688 | 5/1993 | Szlam et al. | 379/67 |
| 5,247,569 | 9/1993 | Cave | 379/113 |
| 5,271,058 | 12/1993 | Andrews et al. | 379/210 |
| 5,291,492 | 3/1994 | Andrews et al. | 370/259 |
| 5,291,550 | 3/1994 | Levy et al. | 379/242 |
| 5,291,551 | 3/1994 | Conn et al. | 379/265 |

(List continued on next page.)

*Primary Examiner*—Allen R. MacDonald
*Assistant Examiner*—Jagdish Patel
*Attorney, Agent, or Firm*—Merchant & Gould P.C.

[57] ABSTRACT

A virtual customer sales and service center is disclosed that connects a customer to a customer access resource through any access method at any time from any customer location. The virtual customer sales and service center includes customer access resources which can both meet customer needs and also acquire and retrieve customer information during a contact, a computer telephony system for gathering interaction data associated with the contact, a rule based routing system for identifying a resource best suited to handle the call and a switch for routing the contact to the identified employee. A customer information database and an employee profile database are included, wherein the best suited resource is identified as having a skill corresponding to the type of customer ascertained from the customer information database and to the retrieved customer information. A context manager and a plurality of service providers are provided. The context manager coordinates access to an appropriate service provider and provides the service provider the context to complete the transaction and interfaces to the rule based routing system. A quality center is included for integrating and aiding in management of a plurality of physical resource locations as a single virtual resource center.

37 Claims, 8 Drawing Sheets

U.S. PATENT DOCUMENTS

| | | | |
|---|---|---|---|
| 5,299,259 | 3/1994 | Otto | 379/221 |
| 5,309,505 | 5/1994 | Szlam et al. | 379/88 |
| 5,309,513 | 5/1994 | Rose | 379/88 |
| 5,317,627 | 5/1994 | Richardson, Jr. et al. | 379/221 |
| 5,325,292 | 6/1994 | Crockett | 705/9 |
| 5,335,268 | 8/1994 | Kelly, Jr. et al. | 379/112 |
| 5,335,269 | 8/1994 | Steinlicht | 379/266 |
| 5,341,374 | 8/1994 | Lewen et al. | 370/450 |
| 5,353,339 | 10/1994 | Scobee | 379/207 |
| 5,355,403 | 10/1994 | Richardson, Jr. et al. | 379/88 |
| 5,392,345 | 2/1995 | Otto | 379/265 |
| 5,392,346 | 2/1995 | Hassler et al. | 379/265 |
| 5,402,474 | 3/1995 | Miller et al. | 379/93.12 |
| 5,404,350 | 4/1995 | DeVito et al. | 370/217 |
| 5,450,482 | 9/1995 | Chen et al. | 370/207 |
| 5,452,350 | 9/1995 | Reynolds et al. | 370/220 |
| 5,459,780 | 10/1995 | Sand | 379/265 |
| 5,467,268 | 11/1995 | Sisley et al. | 705/9 |
| 5,467,391 | 11/1995 | Donaghue, Jr. et al. | 379/265 |
| 5,546,452 | 8/1996 | Andrews et al. | 379/219 |
| 5,555,299 | 9/1996 | Maloney et al. | 379/212 |
| 5,559,877 | 9/1996 | Ash et al. | 379/221 |
| 5,590,188 | 12/1996 | Crockett | 379/225 |
| 5,590,269 | 12/1996 | Kruse et al. | 705/9 |
| 5,594,791 | 1/1997 | Szlam et al. | 379/265 |
| 5,684,870 | 11/1997 | Maloney et al. | 379/212 |
| 5,737,728 | 4/1998 | Sisley et al. | 705/8 |
| 5,768,360 | 6/1998 | Reynolds et al. | 379/220 |

VIRTUAL CUSTOMER SALES AND SERVICE CENTER AND METHOD

CROSS-REFERENCE TO RELATED APPLICATIONS

This application is related to:

Application Ser. No. 09/062,335, entitled "A Rule Based Routing System and Method For A Virtual Sales and Service Center," filed on same date herewith by Bryan Bonting et al., and assigned to the assignee of this application;

Application Ser. No. 09/062,492, entitled "Context Manager and Method For A Virtual Sales and Service Center," filed on same date herewith by Jim Smith et al., and assigned to the assignee of this application; and Application Ser. No. 09/061,999, entitled "Quality Center and Method For A Virtual Sales and Service Center," filed on same date herewith by Charles McDonough et al., and assigned to the assignee of this application.

All of the above-identified applications are incorporated by reference herein.

BACKGROUND OF THE INVENTION

1. Field of the Invention

This invention relates in general to a virtual customer sales and service center, and more particularly to a method and apparatus for connecting any customer to any sales and service resource through any access method at any time from any customer location.

2. Description of Related Art

In the United States, telecommunications is an industry that is undergoing convergence. There is a good deal of discussion about the consolidation of computing and telecommunications into one overarching entity. There is also lot of talk about one wire to the home and one even larger wire or cable to the business.

The trend toward universal data access has brought the focus of two technologies to the solution of a single problem, i.e., integrating telephones and computers to provide access and control of the data residing on both platforms. Computer telephone integration (CTI) is a technology platform that merges voice and data services at the functional level to add tangible benefits to business applications. CTI technology combines voice and data to form a foundation to support business applications, seamlessly combining functions from both the telephony world and the computing world.

Over the years, telecommunications and data technologies have grown more alike. The independent features offered by telephones and computers become even more powerful, useful, and convenient when combined into voice processing applications running on computers. In today's business environment, the telephone is often the primary means of communication in many different situations: placing catalog orders, checking airline schedules, querying prices, reviewing account balances, and recording and retrieving messages. Usually, each telephone call involves a service representative talking to a caller, asking questions, entering responses into a computer, and reading information to the caller from a terminal screen.

When organizations automate this process by linking their computer and telephone systems, they can lower costs, provide better customer service, increase the number of services available, and extend hours of operation. Computer Telephony Integration (CTI) lets customers, for example, use their touch-tone phone to check their bank balance 24 hours a day rather than walk to a cash machine or wait on hold for a customer service representative. And the marriage of phone and computer systems can identify incoming calls, route them to the appropriate person, and deliver the caller's file on a computer screen to the person answering the call—before the call is answered. Accordingly, the road to greater profit runs through a call center for high quality, low-cost customer acquisition and retention.

Today's computer-telephone integration offerings enhance a range of emerging technologies, such as:

Interactive voice response: the ability to input and retrieve information from a computer database via a touch-tone phone;

Fax publishing: the ability to request that fax information be automatically forwarded to the caller via touch-tone phone;

Two-way message notification: the ability to link voice mail and electronic mail (E-mail) systems so that users can collect all messages—voice and data—via a single source CTI provides many benefit to consumers. For example, CTI allows consumers to spend less time on hold, improves response time for callers once they get through to the company, allows instant access to database information, often on a 24-hour basis; provides callback options for callers who don't want to stay on hold, provides access to service reps who, when freed from routine functions, have more time to research and answer complicated questions, and eliminates the need to repeat identification information and reason for calling when transferred to another employee or department.

Businesses also benefit from the use of CTI. For example, the benefits of CTI to business includes prompter and more accurate response to inquiries, orders, and service requests, personalized attention and efficient problem resolution, improved customer and prospects access to information about new products and services, increased number of services available and extended hours of operation.

Increased telesales revenue, higher levels of referral and repeat business, fewer data entry keystroke errors, shorter transaction time, increased employee productivity, improved employee morale, and cost savings from operational efficiency.

Today, the majority of CTI applications are being built for call centers. A call center is a customer business center where initial access is by telephone. Employees working in call centers provide services over the telephone. Their tasks can include placing outgoing calls, answering incoming calls, asking callers for information, or providing services. While handling calls, employees often use desktop computers to enter or retrieve information.

Current call center routing techniques can be difficult to manage and do not simplify the interaction for customers. Routing services within a call center have traditionally been provided through caller initiated functions such as selecting one of several 800 numbers or making a particular selection in the VRU. The routing services do not provide for an effective match of skilled employees with customer value and need. Multi-site call center routing is typically a simple percentage allocation of calls to various sites achieved through the network carrier. Overflow services are managed through the re-assignment of employees to queues. The goal in all these methods is to provide some level of improved service to the customer through a better match of calls to skilled employees and a better use of available Customer Service Representatives (CSRs). These approaches accomplish the routing goals to some degree; however, they require many different mechanisms making it difficult to manage. These mechanisms include: various 800 numbers, network carrier load balancing, VRU routing to queues and static realignment of employees to queues.

The typical CTI call center makes use of products and services from several different sources: public and private networks; voice switches, automatic call distributors, hardware and software from computer vendors, specialized business applications from software suppliers, and components such as voice response units, voice mail systems, call sequencers, predictive dialers, and fax machines.

However, prior CTI call centers have not had the ability to connect any customer to all sales and service resources through any access method at any time from any customer location.

In regard to access method, many companies are dealing with the utilization of new access method types for remote customer interaction including, but not limited to, e-mail, Internet/Web, fax, and kiosks. These are most often dealt with separately from call centers.

Further, prior CTI call centers have not maximized the efficiency and productivity of employees with the call centers and have not even attempted to deal with resources outside the traditional call center domain of VRUs and employees. Whether large or small, call centers are still departments within a larger enterprise. Often, other departments have customer sales and service resources. Other departments may include office, branches, third party locations, etc. Call center technology improvements are typically not shared with these departments and the resources within. As a result, the customer cannot contact those resources as easily as they can those in a call center. Nor can call centers and other departments be effectively coordinated to improve sales and service quality while reducing costs.

It can be seen that there is a need for a virtual customer sales and service center which connects any customer to any resource through any access method at any time from any customer location.

It can also be seen that there is a need for a common technology platform which support all forms of customer interaction including customer self sales and service as well as employee assisted sales and service.

It can also be seen that there is a need for a virtual customer sales and service center which maximizes the efficiency and productivity of the entire enterprise's sales and service resources.

SUMMARY OF THE INVENTION

To overcome the limitations in the prior art described above, and to overcome other limitations that will become apparent upon reading and understanding the present specification, the present invention discloses a virtual sales and service center.

The present invention solves the above-described problems by connecting any customer to any sales and service resource through any access method at any time from any customer location.

A system in accordance with the principles of the present invention includes customer access resources which can both meet customer needs and also acquire and retrieve customer information during a contact, a computer telephony system for gathering interaction data associated with the contact, a rule based routing system for identifying a resource best suited to handle the contact and a switch for routing the contact to the identified resource.

Other embodiments of a system in accordance with the principles of the invention may include alternative or optional additional aspects. One such aspect of the present invention is that a customer information database and an resource profile database are included, wherein the best suited human/automated resource is identified as having a skill corresponding to the expressed or implied need from the customer information database.

Another aspect of the present invention is that the employee/human resource is one of a plurality of resources and wherein the plurality of resources have different physical locations, e.g., there may be thousands of different physical locations.

Another aspect of the present invention is that the type of customer comprises a business segment correlation and a business or consumer indication.

Another aspect of the present invention is that context managers and a plurality of service providers are provided, the context manager manages the overall customer contact from reception to closure, coordinates access to the appropriate service provider(s) and provides the service provider (s) the context to complete the transaction and interfaces to the rule based routing system.

Another aspect of the present invention is that the context manager receives customer initiated responses from a plurality of access methods and provides interfaces between the rule based routing system and the plurality of access methods.

Another aspect of the present invention is that the access method comprise kiosks, Internet sources, on-line sources, and home personal computers.

Another aspect of the present invention is that a quality center is included for integrating and aiding in management of a plurality of physical resource locations as a single virtual resource center.

Another aspect of the present invention is that the quality center manages the functions of the virtual customer sales and service center.

Another aspect of the present invention is that the functions managed by the quality center comprise scheduling and forecasting, performance measurement and feedback, contact monitoring and routing, analysis of the virtual customer sales and service center, help desk, quality and continuous improvement, maintenance and broadcast messaging.

Still another aspect of the present invention is that the context manager queries the service provide to identify cross-sell opportunities, executes cross-sell activities through the appropriate customer access resource including facilitating the routing of cross-sell activities to an identified employee.

Another aspect of the present invention is that the rule based routing system makes routing decisions based upon customer information profiles, resource skills profiles, customer activity, availability of employees and other resources, and overflow management.

Another aspect of the present invention is that the computer telephony processing server manipulates call treatment based on the retrieved customer information.

Another aspect of the present invention is that a first resource transfers customer contacts to a second resource where the first resource specifies the skill requirements of the second resource.

Another aspect of the present invention is that the transfers between the first resource and the second resource is unlimited in number.

Another aspect of the present invention is that the resource profile databases further comprises a statistics server for directly determining which resources are currently available for the contact based on the skill requirements of that contact.

Another aspect of the present invention is that the rule based routing engine checks the routing rules for overflow processing when the statistics server indicates that a resource within the optimal profile is not expected to be available with the desired timeframe.

Yet another aspect of the present invention is that the rule based routing system provides data associated with the identified customer profile of the contact to the identified resource.

Another aspect of the present invention is that the computer telephony processing system comprises intelligent answering functions.

Another aspect of the present invention is that the intelligent answering functions comprise Automatic Number Identification (ANI) information from the telephone system for providing a billing directory number associated with a call and Dialed Number Identification Services (DNIS) for multiple 800 numbers provides additional information to the algorithms which identify who the caller is and what the caller wishes to discuss.

Another aspect of the present invention is that the context manager solely provides an interface between the business process service provider and any customer access resource.

Another aspect of the present invention is that a service provider maintains business logic for determining and fulfilling customer's needs.

Another aspect of the present invention is that the business logic comprises channel independent applets.

Another aspect of the present invention is that the context manager tracks session information of the user experience across customer access resource by creating and terminating context manager objects as sessions start and end.

Another aspect of the present invention is that a plurality of context managers are grouped into modules and multiple modules are employed to deliver infinite scalability while still delivering seamless any customer to any resource connection.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention is a virtual customer sales and service center that provides connection of customers to a resource through any access method at any time from any customer location.

Figure 1:
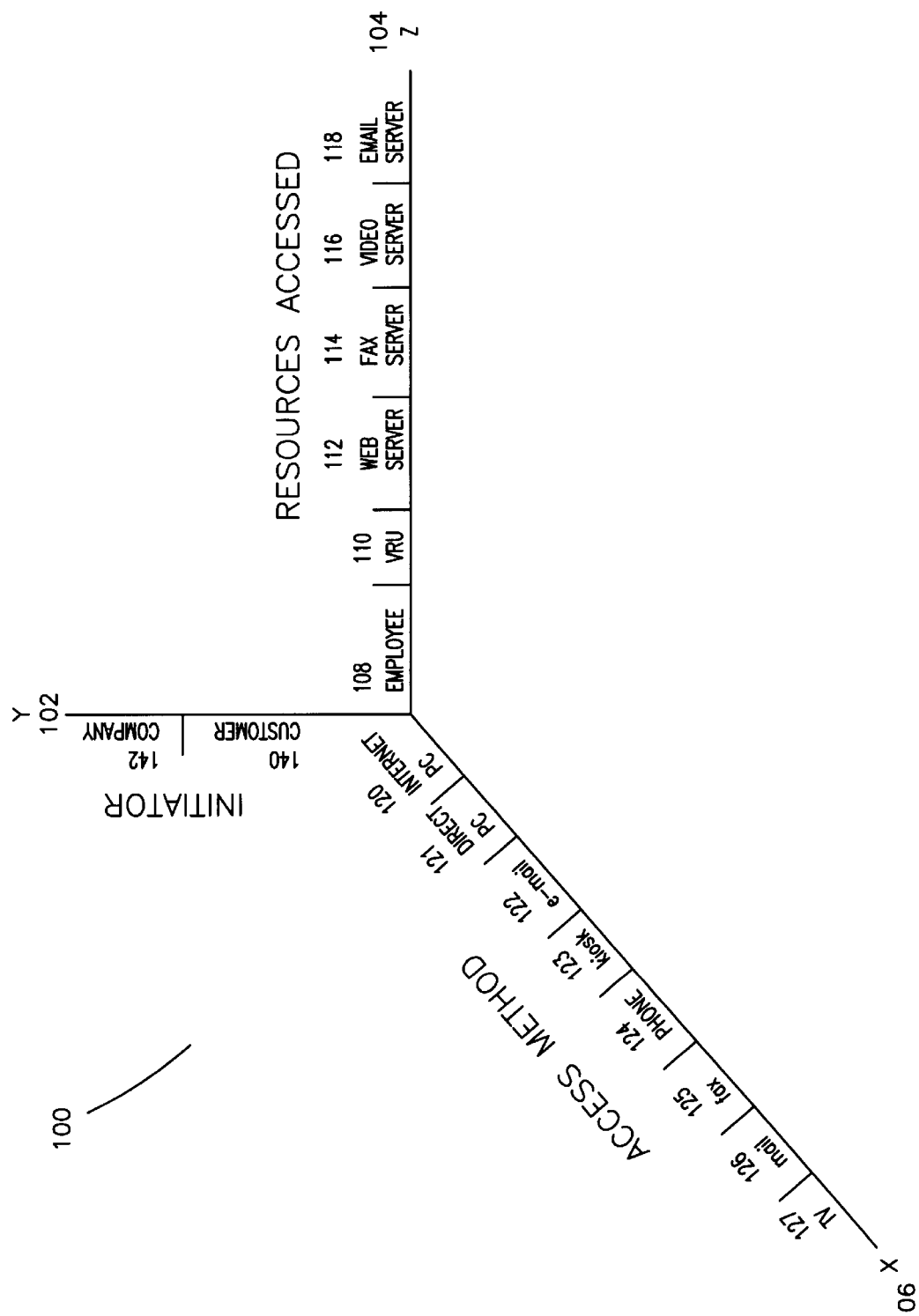
FIG. 1 illustrates a three dimensional representation of the Virtual Sales and Service Center access logistics.

FIG. 1 illustrates a three dimensional representation of the Virtual Sales and Service Center access logistics 100. In FIG. 1, the y axis 102 represents the contact initiator. A customer contact may either be initiated by the customer 140 or by the company 142.

The x axis 106 represents the access method of the customer. Customers may access the Virtual Sales and Service Center from a wide variety of locations using a variety of methods. For example, a customer may access a company through the Internet 120. A customer may access a web page to retrieve customer or company information. The information at the web page may be unsecured information concerning a company's services and/or products. Alternatively, a customer may access secured, personal or private information via encryption, authentication and other digital security measures. Those skilled in the art will recognize that the invention is not limited to a particular instrumentality however.

Other customer access methods may include direct pc access 121, e-mail 122, kiosk 123, phone 124, fax 125, mail 126, tv 127 etc. Those skilled in the art will recognize that the type of customer access method is not meant to be limited to the particular examples outlined herein. The invention provides the interface with any type of customer hardware and access method.

The z axis 104 represents the resources accessed during the contact with the company. The types of resources accessed may include an employee 108. Employees 108 may be in thousands of locations ranging from large call centers with hundreds of persons to small offices or branches with a single person. The skills of employees may vary tremendously including product knowledge, language, sales ability, knowledge of specific customers, etc. As a result, the logistics associated with effectively matching customer contacts are particularly challenging and the benefits are particularly high.

Other resources accessed by customers include the VRU 110, web server 112, fax server 114, video server 116, e-mail server 118, etc. Those skilled in the art will recognize that the type of resource is not meant to be limited to the particular examples outlined herein. The invention provides the interface with any type of resource existing within the company.

Figure 2:
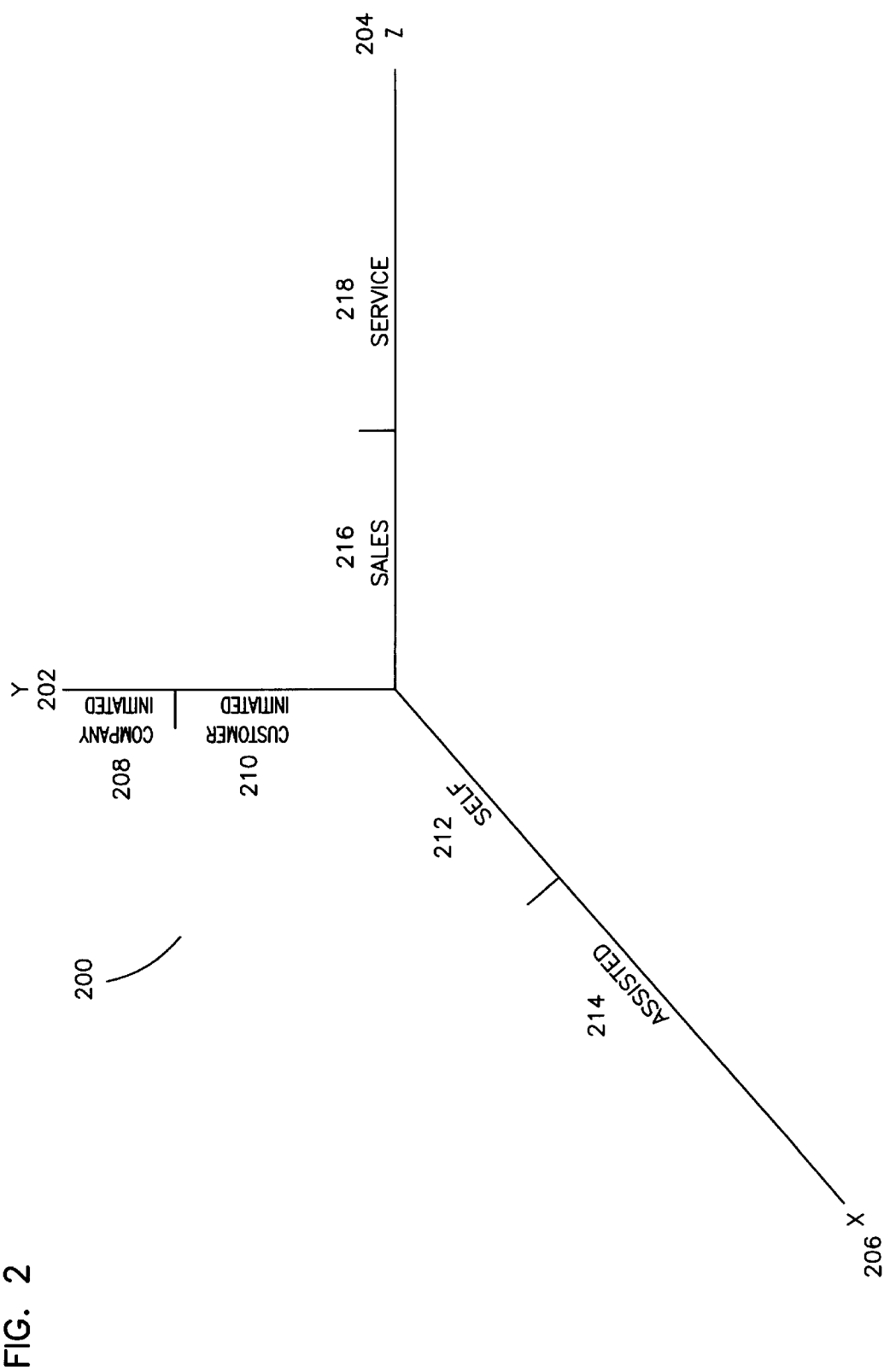
FIG. 2 illustrates the range of customer interactions included with in the scope of the invention.

FIG. 2 illustrates the types of customer interaction 200 included in the scope of this invention.

The y axis 202 represents the initiator. A customer contact may either be initiated by the customer 210 or by the company 208.

The z axis 204 represents the customer purpose. The overall purpose may be sales 216 or service 218.

The x axis 206 represents the interaction style. The interaction style may be self-assisted 212 or assisted 212.

The invention includes the routing and customer-resource matching algorithms to effectively handle any interaction style within the framework shown in FIG. 2.

Figure 3:
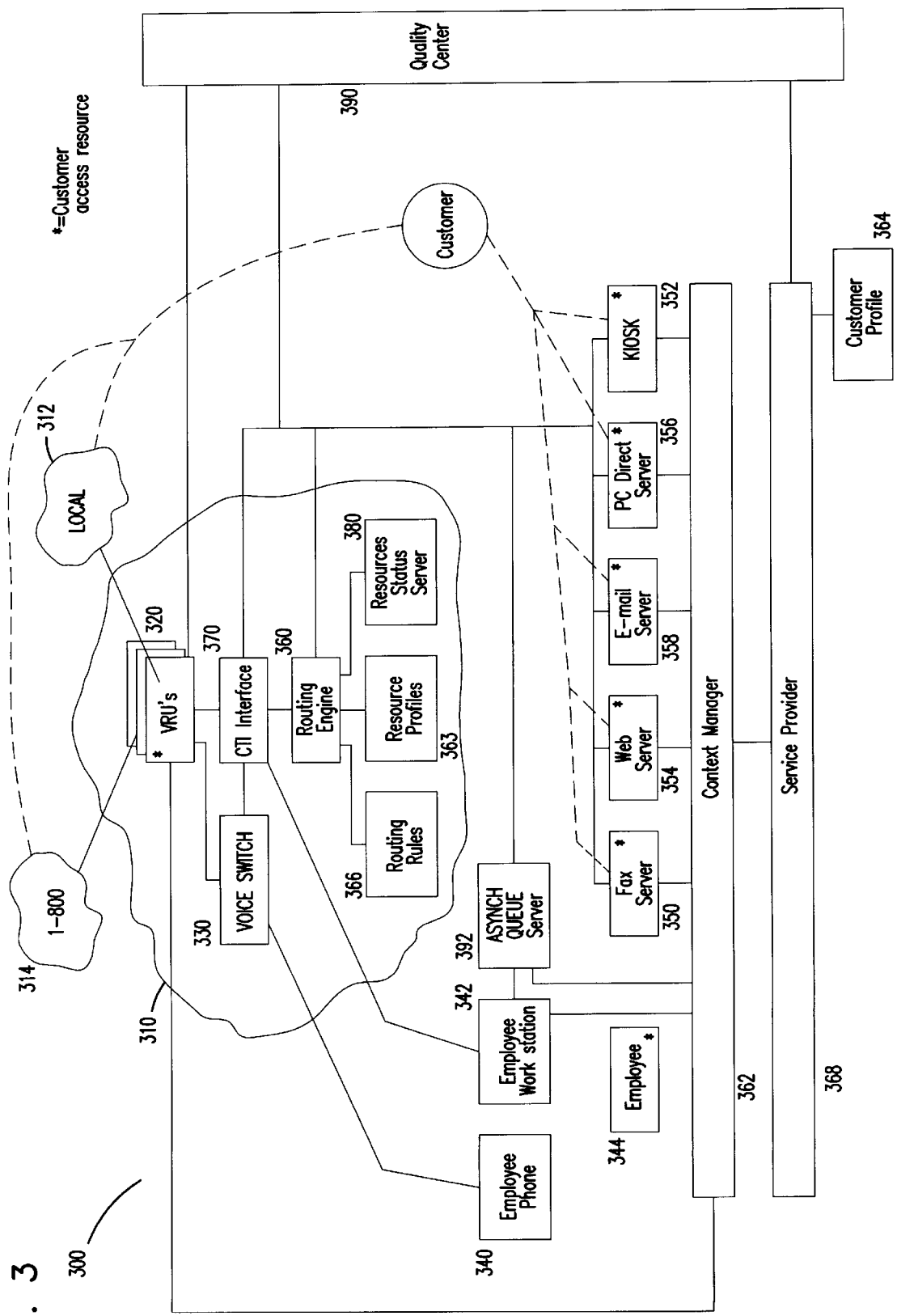
FIG. 3 illustrates a functional diagram of the Virtual Sales and Service Center according to the present invention.

FIG. 3 illustrates a functional diagram of the Virtual Sales and Service Center 300 according to the present invention. Depending on the customer's access method, a number of different resources may accept the initial contact with the customer.

In many companies, the phone is a high volume access method. In the invention a cloud 310 is established to source calls to the Virtual Sales and Service Center 300. All calls, including local numbers 312 and 1-800 numbers 314, are delivered to this cloud 310. Within the cloud 310 are Voice Response Units (VRUs) 320 which play a script that is heard by incoming customers placing calls to the Virtual Sales and Service Center 300. The script played by the VRUs 320 enables a customer profile to be identified. The content of the script is then personalized for each customer, including matching the language being spoken by the caller. The VRUs 320 offer a convenient navigation interface and can both meet customer requests directly or initiate navigation to a resource that can handle the customer request. The VRUs 320 can also execute some cross-sell activities.

Should it be determined that a call needs to be directed to a company employee or other resource, the VRUs interact with the routing engine 360 through the CTI interface 370 to initiate the transfer. The routing engine 360 accesses ANI and DNIS information, customer profile information 364, VRU activity thus far, the routing rules 366, resource profiles 363, and the resource status server 380 to select an available resource based on the customer's expressed or implied need.

ANI is a service offered by telephone networks that provides the billing directory number associated with a calling party. When a customer calls an 800 number to order from a catalog, the call arrives at the call center with the caller's telephone number. The telephone number is passed to a CTI server 370.

Organizations that maintain multiple 800 numbers can also use Dialed Number Identification Services (DNIS) offered by carriers to identify what the caller wishes to discuss. A bank, for example, can assign 800-555-1333 to VISA cards and 800-555-1334 to VISA Gold cards.

The Virtual Sales and Service Center 300 according to the present invention may combine the use of ANI and DNIS with the other information available to it. Furthermore, CTI systems 370 using ANI make it possible for companies to capture information about abandoned calls. If a customer hangs up while waiting for any type of sales and service resource, employees can pro-actively call back customers and offer to be of assistance.

Routing rules 366 are not based on a single queue or gate (e.g. Service) but can be governed by which resource skills can most accurately address the request. Once any type of sales and service resource has obtained a new skill or improved on an existing skill, it becomes a simple task of updating that skills profile 364. Similarly, if additional customer information needs to be included in the routing rules 366, the customer profile 364 is updated to include the routing criteria. Overflow rules within the routing rules 366 are also automated to allow for increased call center management.

Upon obtaining all relevant available requirements information the routing application 360 will access the resource profiles 363 to find resources with the appropriate skills. This resulting set of resources will be used when accessing a statistics server 380 to determine which resources are currently available for the contact. The statistics server 380 provides a real time status of each of the resources' availability. A specific resource will then be selected based on resource availability, skill profiles, and load balancing. If the statistics server 380 indicates that the optimal resource is not available, the routing engine 360 will check its routing rules 366 for overflow processing.

If the overflow resources are available, the call and associated data will be routed to those resources. If the original destination resource and the first overflow resources are not available, the call will be routed to another resource based upon the routing rules.

The routing engine 360 then notifies the VRU 320 with the appropriate call treatment and routing authorization once a resource is selected. The VRUs 320 then send the call to the switch 330 which interacts with the CTI interface 370 to determine the appropriate employee 344 and phone 340. The CTI interface 370 also interacts with the workstation 343 associated with the phone 344 and ensures a screen pop, which provides the employee with the key information such as the customer identity, their need and the presence of a cross-sell opportunity, is delivered at the same time as the actual customer phone call is delivered to the phone 340 by the switch 330.

Contacts may also arrive at a web server 354, a home PC direct connection server 356, a kiosk 353, an e-mail server 358 or a fax server 350.

In all cases, every customer contact is immediately logged with the context manager 362. The Context Manager 350 manages the complexity of dealing with multiple customer interaction devices which must share common business processes. These business processes are distributed across many underlying, heterogeneous systems. The Context manager 362 provides for the management of information which is required over the life of a business event. The Context Manager 350 coordinates access to the appropriate Service Providers 368 and provides the Service Provider 368 the context to complete the business transaction.

As a contact progresses, the VRU 320, the employee workstation 343, the web server 354, the kiosk 353, the fax server 350, the e-mail server 358 and the PC direct server 356 continually interact with the context manager 362.

Contacts may be transferred between resources many times during the course of a call and this transfer activity is coordinated by the context manger 363 and the routing engine 360.

If the contact is asynchronous or if there is work which was initiated but not completed during the course of a synchronous contact, resources may request that the context manager 362 place a request with an asynchronous queue server 392. The routing engine 360 will coordinate the subsequent matching of that request with an available resource which will most often be an employee 344, but may be other resource types.

The Virtual Sales and Service Center 300 uses a suite of products to enable intelligent contact routing in a network cloud, including customer profiles 364, employee skills profiles 363, VRU options 320, availability of employees 340, and overflow management within the routing rules 366. In the preferred embodiment, Genesys computer telephony processing components 360 370 380 provides optimized and flexible solutions to transform the operations from simple interactions between phone calls and voice switch queues into sophisticated high value information exchanges that accomplish real-time matching of customer contacts through any access method with the appropriate resources.

All components in FIG. 3 communicate via LAN-based TCP/IP messaging. This open, distributed architecture provides a scaleable and adaptable solution.

Figure 4:
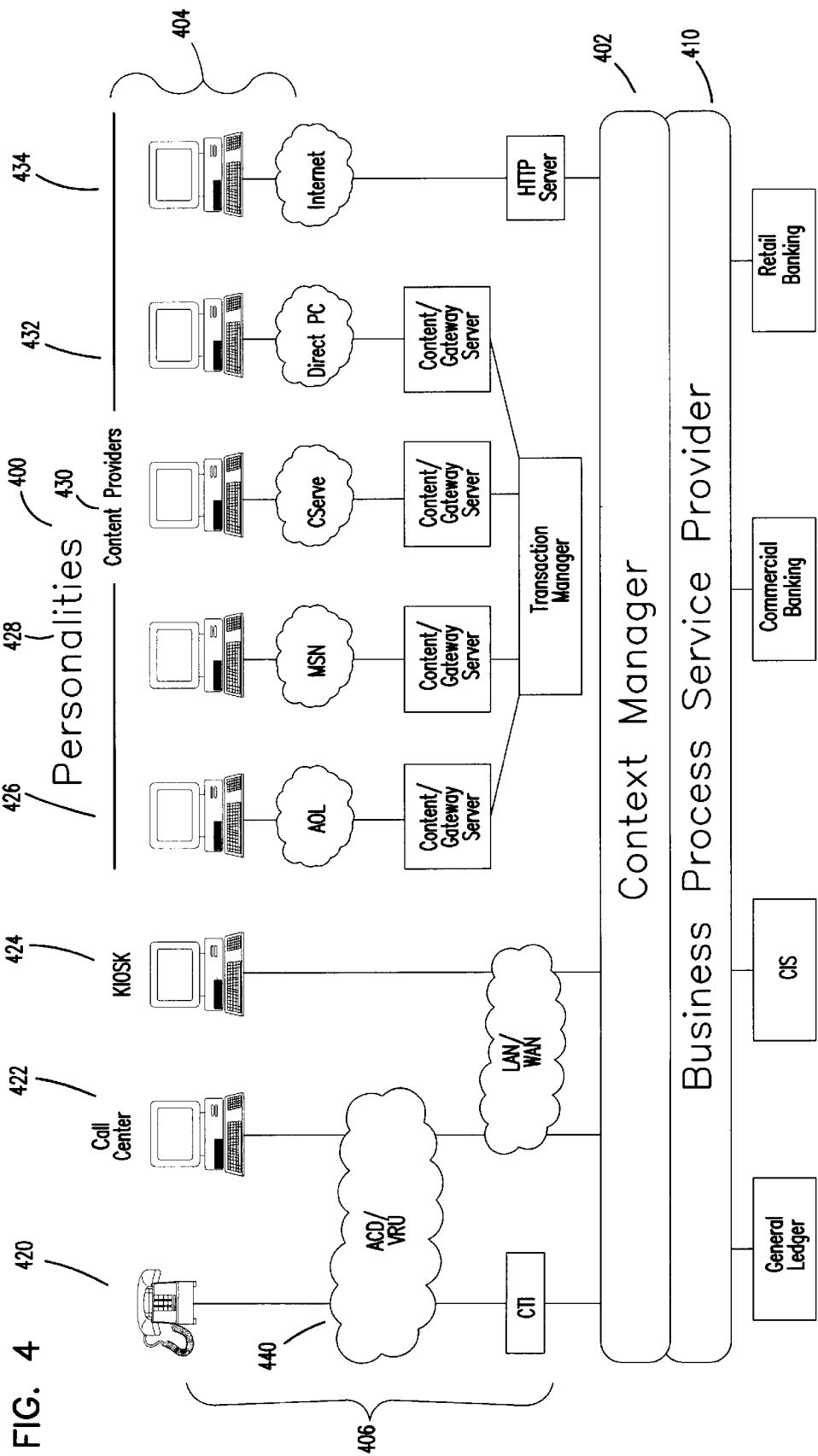
FIG. 4 illustrates an overview of the Context Manager.

FIG. 4 illustrates an overview 400 of the Context Manager 402. The Context Manager 402 provides management capability for multiple customer access resources 404 which share common business processes that may be distributed across many underlying, heterogeneous systems 406. The Context Manager 402 provides the management of information required over the life of the business event. The Context Manager 402 coordinates access to the appropriate business processes and provides them the context to complete each business unit of work.

The Context Manager 402 provides the interface between the business process service provider 410 and the different customer access resources 420–434. Customer access resource types 420–434 are often defined very broadly. Within each type there will be many variants which not only vary due to their specific purpose, but also vary in their behavior as they personalize the customer experience.

While intelligent routing provides rich functionality, the data it uses to make decisions on call attributes must be processed very fast. Customer profiles, customer accounts, and traditional account data will be accessed by a VRU 440 and customer initiated VRU events will be passed to a service provider 410. The service provider 410 maintains the business logic in channel independent applets.

The service provider 410 applies decision logic to determine the customers needs. The result will be a call routing profile that the intelligent routing engine will use to match against the centrally maintained employee profile. The result will be an intelligent routing rule based on custom call profile and skilled employee availability.

The cloud 440 will pass pertinent routing information to the service provider 410 from the VRU. The service provider 410 will then perform a logical combine of the VRU attributes and the customer profile attributes to determine the true routing attributes of the call. For example, in the context of banking, if a customer performed a loan payoff request in the VRU and had a cross-sell indicated on their customer profile, then the routing profile would indicate that a cross-sell was "Yes". This routing information may include tier, product(s), type of service, type of customer banking, language captured from DNIS, and number of transfers indicator.

The present invention emphasizes the use of Component and Object Technology. The Object Management Group's (OMG) Common Object Request Broker Architecture (CORBA) may be used for distributed computing and object messaging. In this manner, product availability, openness and functionality goals can be satisfied.

Figure 5:
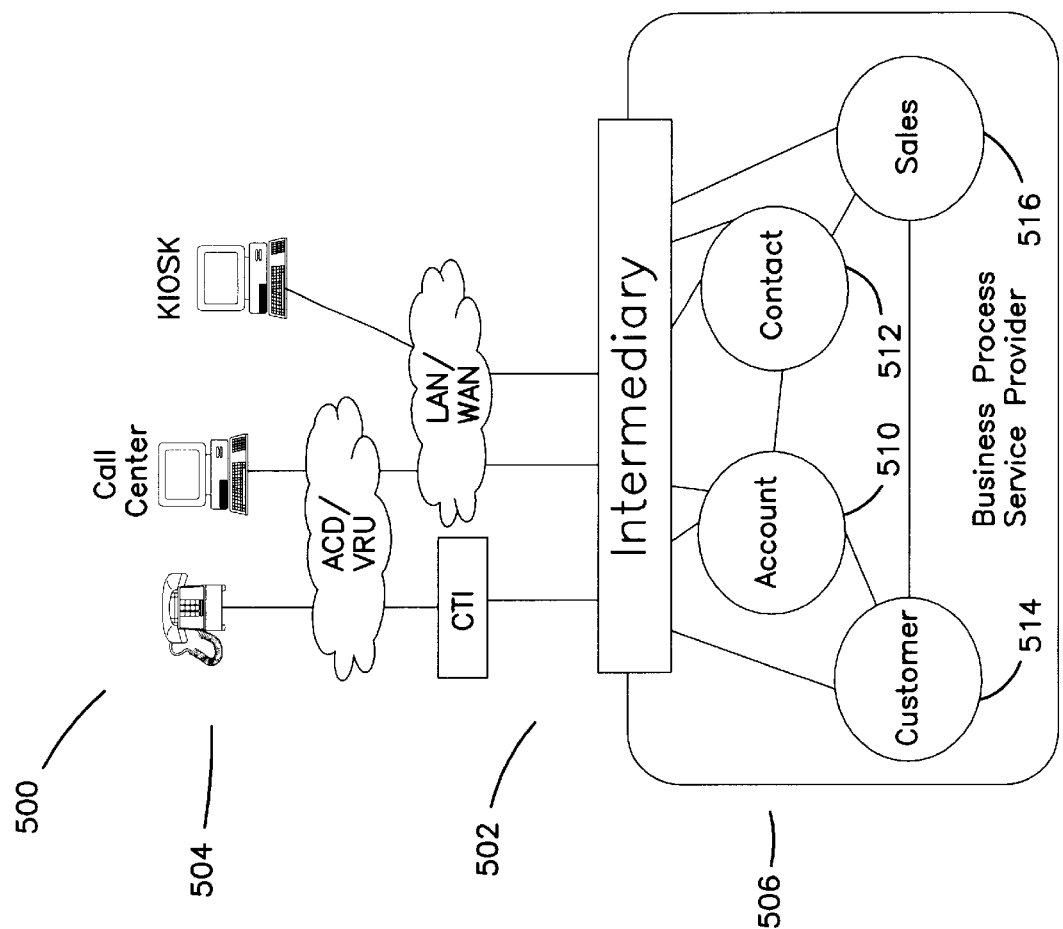
FIG. 5 illustrates the interaccess methodry role of the Context Manager.

FIG. 5 illustrates the intermediary role 500 of the Context Manager. The simplest function of the Context Manager is that of intermediary 502 between the complexity of the customer access resource 504 and the underlying business process/service provider subsystem 506. In this role, the Context Manager 502 essentially acts as an interface to multiple objects, and combines the public operations or functions of the underlying objects to provide a single interface.

In this way, the Context Manager 502 acts as a bridge to the underlying system. Customer access resource 504 request high-level business processes of the Context Manager 502 through its component interface and the Context Manager 502 relays the request on to the business components 510-516 that comprise the overall solution.

Figure 6:
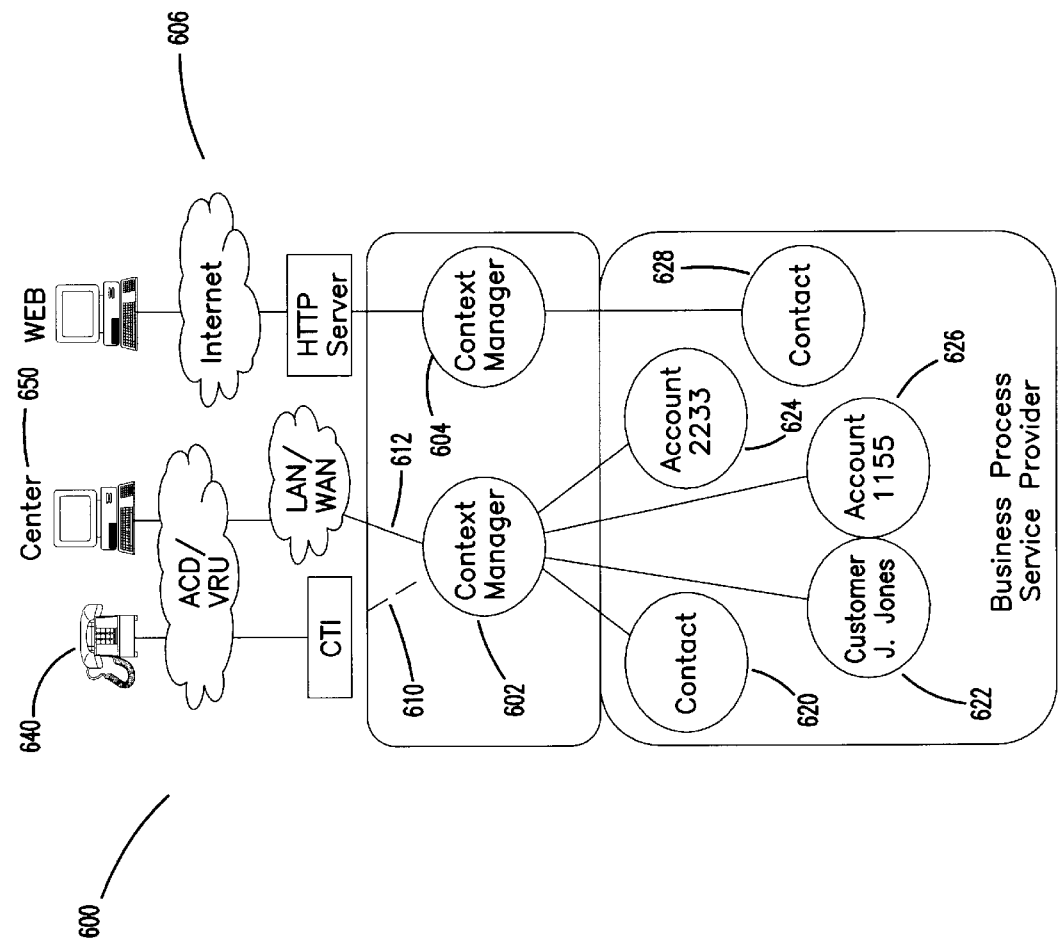
FIG. 6 illustrates the session management functionality.

FIG. 6 illustrates the session management functionality 600. The second role of the Context Manager 602, 604 is to keep track of "session" information or context of the user experience across customer access reources. The Context Manager creates and destroys objects 610 as sessions start and end to manage the business processes. Each Context Manager 602, 604 maintains a relationship to all of the business objects that represent the context for the given session. The sets of relationships that Context Manager 602, 604 maintains during a given session is dependent on the business processes the particular session is using.

If a user elects to switch from one resource 640 to another resource 650 during a "session" (for example a user transfers from the VRU to a Customer Sales and Service Center Customer Service Representative), the context can be transferred by simply forwarding the appropriate Context Manager's object identifier 610 to the second resource 612. Each time a user requests information by establishing a new session through one of the customer access resources 660, a new Context Manager object 604 is created. The new Context Manager object 604 represents the session context for that specific interaction.

Additionally, context of a session can be shared among several customer access resources 606 simply by sharing the appropriate Context Manager object 602, 604. Each customer access resource 606 can access the same Context Manager object 602, 604 to perform simultaneous, concurrent functions. Since the access method 606 do not maintain any context about the session, there are no issues with respect to data integrity or the misrepresentation of a business object's state.

Figure 7:
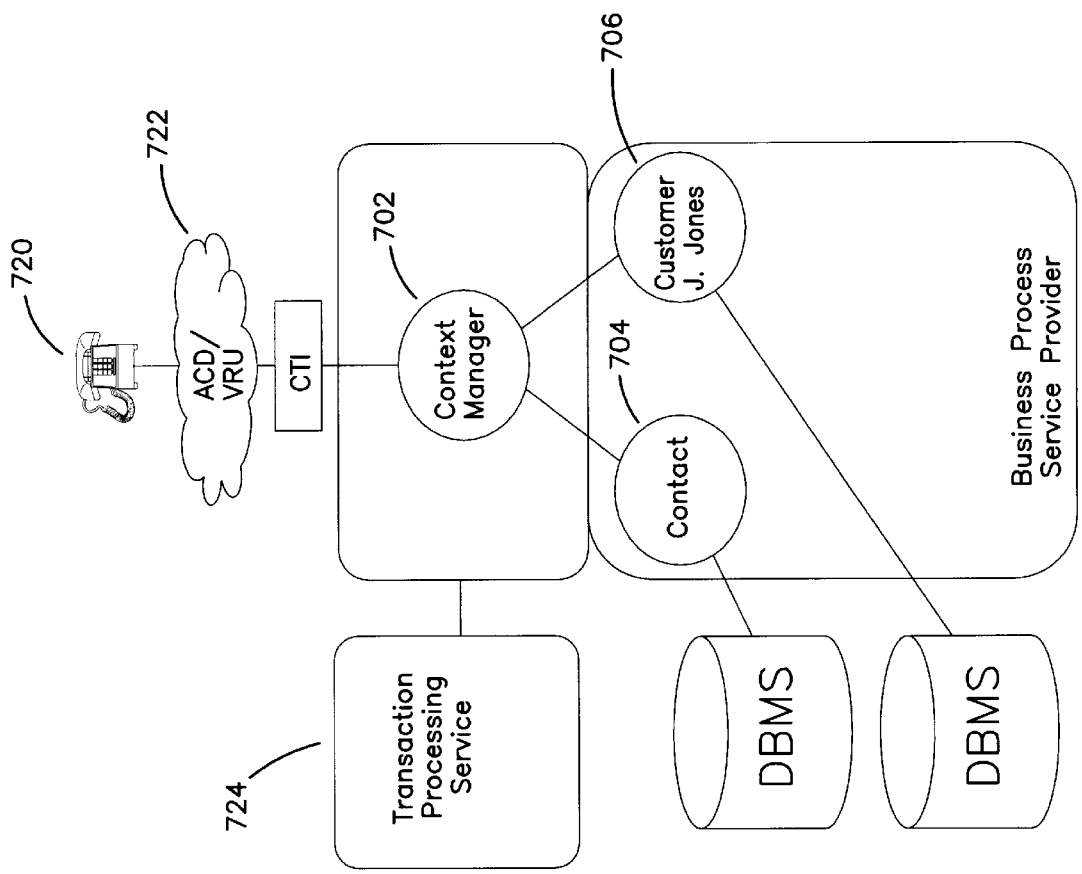
FIG. 7 is a transaction management diagram illustrating the states of the business objects.

FIG. 7 is a transaction management diagram 700 illustrating the states of the business objects. Transaction integrity is of critical importance when dealing with heterogeneous objects distributed across multiple processing servers. Transaction management is a fundamental piece of context management that guarantees and preserves the data integrity of the objects that comprise the overall solution. The ability to allow a diverse set of objects to participate in any given transaction becomes critically important when dealing with data that spans multiple objects and is stored in multiple places.

As shown in FIG. 7, Context Manager 702 fulfills this role by assuming the responsibility for the initiation and coordination of multiple business activities 704, 706. Context Manager 702 logically groups these atomic business activities into a business unit of work. A business unit of work typically involves a state change to one or more of the business objects that comprise the various business activities 704, 706.

In FIG. 7, Context Manager 702 ensures that the business units of work that are defined by the business functions are uniformly handled across the range of different access method. For example, a customer calls 720 a business, identifies themselves to the VRU 722, and decides to make an address change for all future correspondence. Context Manager 702 initiates a transaction with the transaction service 724. Context Manager 702 invokes the update address operation on the Customer object 706 which in turn registers interest in the transaction. Context Manager 702 invokes the update contact history operation on the Contact object 704 which in turn registers interest in the transaction. Context Manager 702 tells the transaction service 724 to commit the update address operation, and the transaction service 724 coordinates the updates among the various components.

With the introduction of a virtual customer sales and service center, some of the current activities that take place at each individual customer sales and service center will change. Rather than managing each location as a separate facility, all resources will be managed and operated as a single virtual organization. There are also workforce implications with the implementation of this new environment.

Turning again to FIG. 3, a centralized operating unit, referred to as the Quality Center 390, will perform the virtual customer sales and service center monitoring and reporting functions. The Quality Center 390 integrates and aids in managing a plurality of physical resource locations as a single virtual customer sales and service center 300. The functions pertaining to managing the business through the Quality Center 390 are organized into the following eight categories:

Scheduling and Forecasting,

Performance Measurement and Feedback,

Call Monitoring and Routing,

Analysis,

Help Desk,

Quality and Continuous Improvement,

Maintenance and

Broadcast Messaging.

These functions support the overall business process associated with operating a virtual customer sales and service center environment. Within each business area, the focus is on distinct business processes needed to operate and support a multi-site, virtual customer sales and service center environment.

Figure 8:
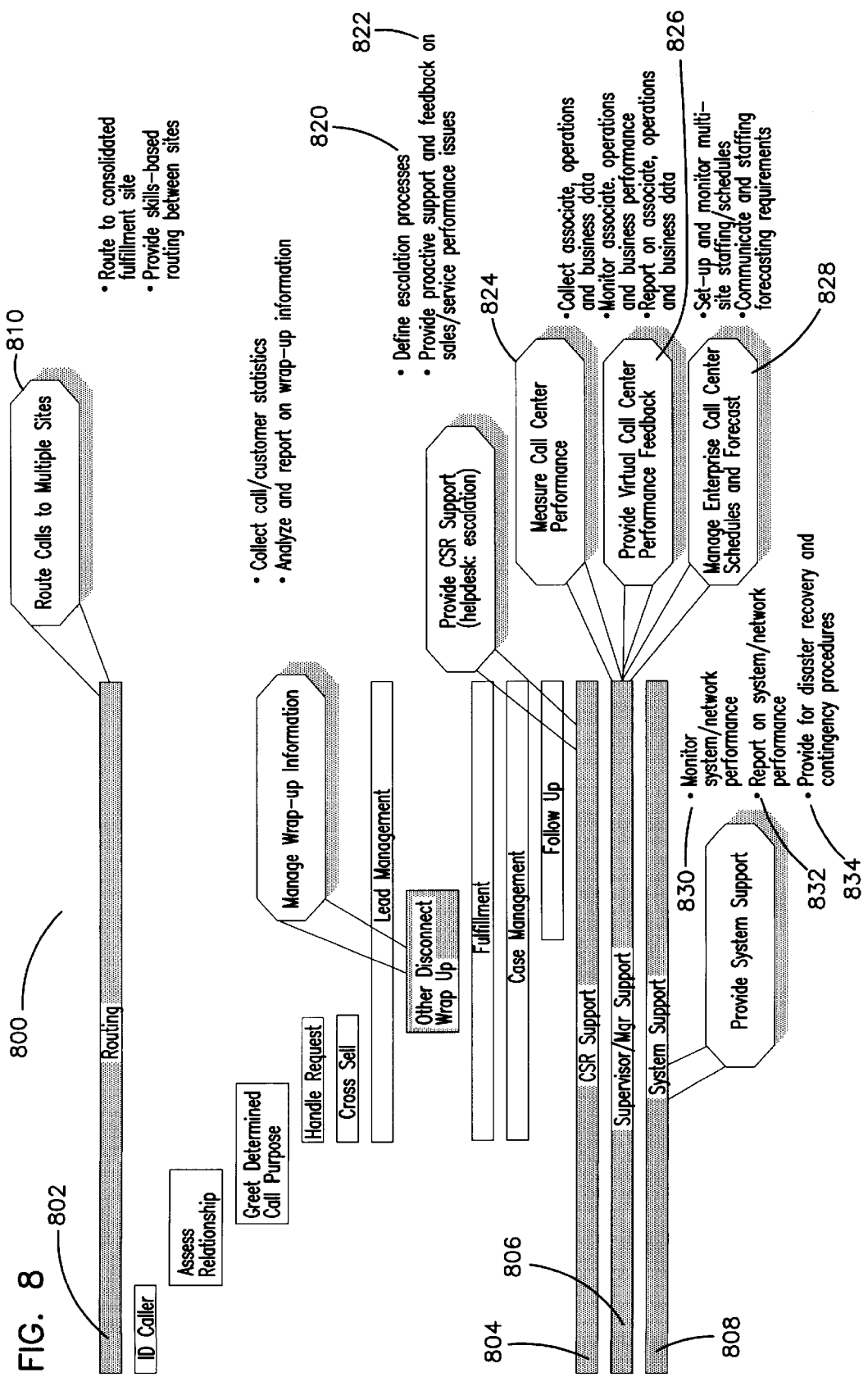
FIG. 8 is a outline of the business processes for operating and supporting a multi-site, virtual customer sales and service center.

FIG. 8 is an outline 800 of the business processes for operating and supporting a multi-site, Virtual Sales and Service Center.

The business processes 800 illustrated in FIG. 8 include routing 802, customer service support 804, supervisor/management support 806 and system support 808. The routing processes 802 are supervised and modified as necessary by the Quality Center. For example, the Quality Center may adjust the routing rules in cases of inclement weather forcing the shutdown of a particular location by routing calls to multiple sites 810.

The Quality Center will provide customer service support 804 by defining escalation processes 820 and providing proactive support and feedback on sales/service performance issues 822. The Quality Center will also measure the performance of the Virtual Sales and Service Center 824, provide performance feedback 826 and manage the staffing, schedule and forecasting 828 for the Virtual Sales and Service Center 300. System support 808 will be provided by the Quality Center in the form of monitoring of 830 and reporting on 832 the system performance, and providing disaster recover and contingency procedures 834.

Referring again to FIG. 3, according to the present invention, the routing rules 366 are the step-by-step instructions which combine the routing components to identify what resource will receive a particular contact. Skills based routing methodology uses the skills and experience of each resource. The skills and experience of each resource is then matched against the requirements and characteristics of a particular contact to assign any type of sales and service resource to the contact. Contacts can be assigned to any resource that has the skills required for the contact. Similarly, overflow can be to any resource with the required skills. Intelligent rule based routing, facilitated by the routing engine 360 and the routing rules 366, provides several advantages to a Virtual Sales and Service Center. First, rule based routing reduces customer confusion with few/one access numbers for all of a company's products. Service is improved by getting the customer to the right resource the first time thereby reducing transfers. Rule based routing provides distinctive service levels based on a customers relationship.

Further, rule based routing can capitalize on "moment in time" relationship expansion opportunities by routing identified calls to skilled cross-sell and sales employees and can route callers to appropriate specialized employees based on callers request.

The efficiency of all sales and service resources is improved by balancing contacts across the enterprise resource pool and management of these resources may be more automated through routing rules 366 designed to automatically handle overflow situations. This means that fewer resources, particularly expensive human resources, are required to handle peak contact volumes while maintaining the desired customer experience.

In addition, rule based routing allows positioning for mass customization of contacts based on customer indicated preferences.

To remain competitive, businesses must retain their most profitable customers and pro-actively increase customer profitability. According to the present invention, this strategy is implemented by segmenting customers and allocating resource levels to each to so as to deliver the desired customer experience. For example, contacts from the most profitable customers would be answered by a business's most skilled and experienced employees while calls from the least profitable customers can be answered by the least experienced and skilled employees.

Many contacts into the Virtual Sales and Service Center 300 also offer unique cross-sale opportunities. For example, if a customer is contacting to pay off a loan, then the customer may be interested in a new loan. If the customer has only a checking account, then the customer may be a candidate for other services. Customers should be routed to specially trained cross-sale specialists and/or customer interaction technology resources may be directed to issue cross sell messages to the customer when these unique cross-sale opportunities are identified.

To facilitate this objective, the Voice Response Units (VRUs) 320 are scripted to identify the type of service the customer desires prior to transferring the call to any type of sales and service resource. This information will then be used to route the customer to a sales and service resource with the appropriate skills for that service. Specific requests for employee extensions can also be provided via a script.

In prior systems, contacts are often balanced between centers based on "expected" call arrival and staffing assumptions. However, the percentage of contacts allocated to each call center must be manually adjusted when actual arrival rates do not match the "expected" arrival rates. According to the present invention, contact routing automatically balances contacts between all resource locations because all resources in all locations can be considered during any route request.

Further, the present invention automatically routes contacts to overflow resources when optimal resources are unavailable.

Businesses need to develop a "relationship" with each customer. However, relationships are best developed when a customer speaks with any type of sales and service resource that is familiar with the customer and his or her needs. Call routing according to the present invention contributes to building customer relationships by routing calls to resources that have previously dealt with the customer. Rule based routing provides the customer the ability to request a specific employee or in the absence of a specific employee request, route the customer to any type of sales and service resource with whom he or she has previously interacted. If that particular employee is not available the customer should be able to request a contact back from the employee.

The rule based routing system also provides a framework where additional routing functionality can be easily developed for the Virtual Sales and Service Center 300. Intelligent routing technology assures that calls are routed to employees with the necessary skills to provide the highest quality of service to the contacting customer. This technology utilizes information gathered from the customer profile 364 and seeks to make an appropriate match to that of any type of sales and service resource's profile 363. Routing decisions are therefore not based on a single queue or gate (e.g. Service) but can be governed by which resource's skills can most accurately address the caller's request. Once any type of sales and service resource has obtained a new skill or improved on an existing skill, it becomes a simple task of updating that employee's skills profile 363. Similarly, if additional customer information needs to be included in the routing decision, the customer profile 364 is updated to include the routing criteria. Overflow rules are also automated to allow for increased contact center management.

Accordingly, an intelligent rule based routing system according to the present invention can provide single 800 number access for all products and services; pre-routing between multiple resource centers based on availability of particular employee skill sets; skills based routing via employee and customer profile matching; contact overflow management based on automated rules and pre-programmed next best routes; improved call management by reduced points of control; service level distinction based on customer value profile once customer is identified; and mass customization of routing based on detailed employee profiles 363 and customer profiles 364.

In summary, the virtual customer sales and service center provides anywhere, anytime service and interacts with each customer as a market of one. The virtual customer sales and service center interfaces the customer with the right resource to fulfill the customer's needs in a fast and easy manner. Different levels of service are provided by the virtual customer sales and service center depending on the nature of the present and potential customer relationship. The seamless integration of sales and service improves revenue opportunities, while ensuring a consistently positive customer experience. The VRU is disposed at the front of the virtual customer sales and service center for maximum flexibility.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A virtual customer sales and service center, comprising: customer access resources with which customers can directly interact;
   a computer telephony system for gathering interaction data associated with the customer contact;
   a rule based routing system, operatively coupled to the customer access resources and the computer telephony system, for identifying a customer access resource best suited to handle the contact;
   a switch, operatively coupled to the rule based routing system, for routing a voice call to the identified resource; and
   comprising a quality center for integrating and aiding in management of a plurality of physical resource locations as a single virtual resource center;
   wherein the quality center manages virtual customer sales and service center operations to define an escalation process for handling the customer contact during the customer contact.

2. The virtual customer sales and service center of claim 1 wherein the resource is one of a plurality of resources and wherein the plurality of resources have different physical locations.

3. The virtual customer sales and service center of claim 1 further comprising a customer information database and a resource profile database, wherein a best suited resource is identified as having a skill corresponding to the type of customer ascertained from the customer information database.

4. The virtual customer sales and service center of claim 3 wherein the best suited resource is one of a plurality of resources and wherein the plurality of resources have different physical locations.

5. The virtual customer sales and service center of claim 3 wherein the type of customer comprises a business segment correlation and a business or consumer indication.

6. The virtual customer sales and service center of claim 1 further comprising context managers and service providers, the context managers manage overall customer contact, coordinate access to an appropriate service provider, provides the service providers the context to complete the transaction and interface to the rule based routing system.

7. The virtual customer sales and service center of claim 6 wherein the context manager receives customer initiated responses from a plurality of resources and provides interfaces between the rule based routing system and the plurality of resources.

8. The virtual customer sales and service center of claim 7 wherein the customer access resources comprise kiosks, Internet sources, on-line sources, and home personal computers.

9. The virtual customer sales and service center of claim 6 wherein the context managers query the service provider to identify cross-sell opportunities, and direct the execution of cross-sell activities through an appropriate customer access resource, including facilitating the routing of cross-sell activities to the appropriate customer access resource identified as a cross-sell resource based on skill requirements determined by the first resource.

10. The virtual customer sales and service center of claim 6 wherein customer contacts are transferred form a first resource to a second resource.

11. The virtual customer sales and service center of claim 10 wherein the transfers between the first resource and the second resource is unlimited in number.

12. The virtual customer sales and service center of claim 1 wherein the quality center manages virtual customer sales and service center operations to provide proactive support and feedback on sales and service performance issues after the end of the customer contact.

13. The virtual customer sales and service center of claim 12 wherein the functions managed by the quality center further comprise scheduling and forecasting, performance measurement and feedback, contact monitoring and routing, analysis of the virtual customer sales and service center, help desk, quality and continuous improvement, maintenance and broadcast messaging.

14. The virtual customer sales and service center of claim 1 wherein the rule based routing system makes routing decisions based upon customer information profiles, employee skills profiles, customer input, availability of employees, customer access resources, computer telephony system resources, service provider resources, switch resources, and overflow management.

15. The virtual customer sales and service center of claim 1 wherein the computer telephony processing server manipulates call treatment based on the retrieved customer information.

16. The virtual customer sales and service center of claim 1 wherein the rule based routing system further comprises a resource profile database comprising a statistics server for directly determining which resource is currently available for the contact.

17. The virtual customer sales and service center of claim 16 wherein the rule based routing engine checks the routing rules for overflow processing when the statistics server indicates that a resource having an optimal profile is not expected to be available within a desired timeframe.

18. The virtual customer sales and service center of claim 1 wherein the rule based routing system provides data associated with the identified customer profile of the contact to the identified resource.

19. The virtual customer sales and service center of claim 1 wherein the computer telephony processing system comprises intelligent answering functions.

20. The virtual customer sales and service center of claim 1 wherein the intelligent answering functions comprise Automatic Number Identification (ANI) information from the telephone system for providing a billing directory number associated with a call and Dialed Number Identification Services (DNIS) for multiple 800 numbers for identifying what the caller wishes to discuss.

21. A virtual customer sales and service center, comprising:
   customer access resources with which customers can directly interact;
   a computer telephony system for gathering interaction data associated with the customer contact;
   a rule based routing system, operatively coupled to the customer access resources and the computer telephony system, for identifying a customer access resource best suited to handle the contact;
   a switch, operatively coupled to the rule based routing system, for routing a voice call to the identified resource; and
   context managers and service providers,
   wherein the context managers manage overall customer contact, coordinate access to an appropriate service provider, provides the service providers the context to complete the transaction and interface to the rule based routing system; and
   the context manager solely provides an interface between the business process service provider and customer access resource.

22. A virtual customer sales and service center, comprising:
   customer access resources with which customers can directly interact;
   a computer telephony system for gathering interaction data associated with the customer contact;
   a rule based routing system, operatively coupled to the customer access resources and the computer telephony system, for identifying a customer access resource best suited to handle the contact;
   a switch, operatively coupled to the rule based routing system, for routing a voice call to the identified resource; and
   context managers and service providers,
   wherein the context managers manage overall customer contact, coordinate access to an appropriate service provider, provides the service providers the context to complete the transaction and interface to the rule based routing system; and
   the context manager tracks session information of the user experience across customer access resources by creating and terminating context manager objects as sessions start and end.

23. A virtual customer sales and service center, comprising:
   customer access resources with which customers can directly interact;
   a computer telephony system for gathering interaction data associated with the customer contact;
   a rule based routing system, operatively coupled to the customer access resources and the computer telephony system, for identifying a customer access resource best suited to handle the contact;
   a switch, operatively coupled to the rule based routing system, for routing a voice call to the identified resource; and
   context managers and service providers,
   wherein the context managers manage overall customer contact, coordinate access to an appropriate service provider, provides the service providers the context to complete the transaction and interface to the rule based routing system; and
   a plurality of context managers are grouped into modules and multiple modules are employed to deliver infinite scalability while still delivering seamless connection of any customer to any resource.

24. A virtual customer sales and service center, comprising: customer access resources with which customers can directly interact;
   a computer telephony system for gathering interaction data associated with the customer contact;
   a rule based routing system, operatively coupled to the customer access resources and the computer telephony system, for identifying a customer access resource best suited to handle the contact;
   a switch, operatively coupled to the rule based routing system, for routing a voice call to the identified resource; and
   a service provider for maintaining business logic for determining and fulfilling a customer's needs.

25. The virtual customer sales and service center of claim 24 wherein the business logic comprises customer access resource independent applets.

26. A method of forming a virtual customer sales and service center, comprising the steps of:

providing customers with access to customer access resources which can both meet customer needs and also acquire and retrieve customer information during a contact;

identifying a resource best suited to handle the contact using a rule based routing system for processing the retrieved customer information and the gathered interaction data; and routing the call to the identified resource; and integrating and aiding in management of a plurality of physical resource locations as a single virtual resource center to define an escalation process for handling the customer contact during the customer contact;

wherein the steps of integrating and aiding in management of a plurality of physical resource locations comprises the step of managing scheduling and forecasting of employees, performance measurement and feedback, contact monitoring and routing, analysis of the virtual customer sales and service center, help desk, quality and continuous improvement, maintenance and broadcast messaging.

27. The method of claim 26 wherein the method of identifying a resource comprises the step of identifying one of a plurality of resources having different physical locations.

28. The method of claim 26 wherein the step of identifying the best suited resource further comprises the step of determining a resource having a skill corresponding to the type of customer ascertained from the retrieved customer information.

29. The method of claim 27 wherein the type of customer comprises a business segment correlation and a business or consumer indication.

30. The method of claim 26 further comprising the steps of managing overall customer contact, coordinating access to an appropriate service provider, providing the appropriate service provider a context to complete the transaction and interfacing to the rule based routing system.

31. The method of claim 30 further comprising the steps of receiving customer initiated responses from a plurality of customer access resources and providing interfaces between the rule based routing system and the plurality of resources.

32. The method of claim 31 wherein the customer access resources comprise kiosks, Internet sources, on-line sources, and home personal computers.

33. The method of claim 26 wherein the step of providing customers with access to customer access resource further comprises the step of interacting with the customer and with the context manager and service provider, wherein the context manager and service provider determine the existence of cross-sell opportunities and the manner for executing cross-sell activities, and facilitate the routing of cross-sell activities to an identified resource.

34. A method of forming a virtual customer sales and service center, comprising the steps of:

providing customers with access to customer access resources which can both meet customer needs and also acquire and retrieve customer information during a contact;

identifying a resource best suited to handle the contact using a rule based routing system for processing the retrieved customer information and the gathered interaction data; and routing the call to the identified resource; and identifying a resource further comprises the step of directly determining which resources are currently available for the contact;

wherein the step of identifying an resource further comprises the step of processing customer information profiles, resource skills profiles, customer contact information, availability of resources, and overflow management parameters.

35. A method of forming a virtual customer sales and service center, comprising the steps of:

providing customers with access to customer access resources which can both meet customer needs and also acquire and retrieve customer information including customer interaction data during a contact;

identifying a resource best suited to handle the contact using a rule based routing system for processing the retrieved customer information and the customer interaction data; and routing the call to the identified resource;

wherein the step of identifying a resource further comprises the steps of directly determining which resources are currently available for the contact and checking routing rules for overflow processing when a resource having an optimal profile is not expected to be available within a desirable time frame.

36. A method of forming a virtual customer sales and service center, comprising the steps of:

providing customers with access to customer access resources which can both meet customer needs and also acquire and retrieve customer information including customer interaction data during a contact;

identifying a resource best suited to handle the contact using a rule based routing system for processing the retrieved customer information and the customer interaction data;

routing the call to the identified resource; and providing data associated with the retrieved customer information during the contact to the identified resource.

37. A method of forming a virtual customer sales and service center, comprising the steps of:

providing customers with access to customer access resources which can both meet customer needs and also acquire and retrieve customer information including customer interaction data during a contact;

identifying a resource best suited to handle the contact using a rule based routing system for processing the retrieved customer information and the customer interaction data;

routing the call to the identified resource; and tracking session information across customer access resources by creating and terminating context manager objects as sessions start and end.

* * * * *

UNITED STATES PATENT AND TRADEMARK OFFICE
CERTIFICATE OF CORRECTION

PATENT NO. : 6,070,142
DATED : May 30, 2000
INVENTOR(S) : McDonough et al.

It is certified that error appears in the above-identified patent and that said Letters Patent is hereby corrected as shown below:

Column 1,
Line 10, "Bonting" should read -- Bunting --

Column 12,
Line 37, delete the word "to" after the word "each"

Signed and Sealed this

Thirteenth Day of November, 2001

Attest:

*Nicholas P. Godici*

NICHOLAS P. GODICI
*Attesting Officer*     *Acting Director of the United States Patent and Trademark Office*

UNITED STATES PATENT AND TRADEMARK OFFICE
CERTIFICATE OF CORRECTION

PATENT NO. : 6,070,142
DATED : May 30, 2000
INVENTOR(S) : McDonough et al.

Page 1 of 1

It is certified that error appears in the above-identified patent and that said Letters Patent is hereby corrected as shown below:

<u>Column 1,</u>
Line 10, "Bonting" should read -- Bunting --

<u>Column 12,</u>
Line 37, delete the word "to" after the word "each"

Signed and Sealed this

Twenty-second Day of January, 2002

Attest:

JAMES E. ROGAN
*Attesting Officer*  *Director of the United States Patent and Trademark Office*